US006875974B2

(12) United States Patent
Muesch et al.

(10) Patent No.: US 6,875,974 B2
(45) Date of Patent: Apr. 5, 2005

(54) DEVICE FOR DETECTING THE ANGLE OF INCIDENCE OF RADIATION ON A RADIATION INCIDENCE SURFACE

(75) Inventors: Erhard Muesch, Werne (DE); Wolfram Budde, Wesel (DE)

(73) Assignee: ELMOS Semiconductor AG, Dortmund (DE)

( * ) Notice: Subject to any disclaimer, the term of this patent is extended or adjusted under 35 U.S.C. 154(b) by 162 days.

(21) Appl. No.: 10/420,788

(22) Filed: Apr. 23, 2003

(65) Prior Publication Data
US 2003/0197114 A1 Oct. 23, 2003

(30) Foreign Application Priority Data
Apr. 23, 2002 (DE) ......................... 102 18 160

(51) Int. Cl.$^7$ ................... G01C 21/02; G01C 21/24; G01J 1/20
(52) U.S. Cl. ................. 250/203.1; 257/435; 250/203.4
(58) Field of Search ............... 250/203.1–203.4; 244/158 R; 126/600; 136/243; 257/431–435

(56) References Cited

U.S. PATENT DOCUMENTS

| 5,264,910 A | | 11/1993 | Hill |
| 5,602,384 A | * | 2/1997 | Nunogaki et al. ....... 250/203.4 |
| 6,274,862 B1 | | 8/2001 | Rieger |
| 2002/0053635 A1 | | 5/2002 | Schroter et al. |

FOREIGN PATENT DOCUMENTS

EP  0 747 719 A1  12/1996

* cited by examiner

Primary Examiner—Stephone B. Allen
Assistant Examiner—Patrick J. Lee
(74) Attorney, Agent, or Firm—Birch, Stewart, Kolasch & Birch, LLP (57) ABSTRACT

A device for detecting the angle of incidence of radiation on a radiation incidence surface (14) comprises at last two first pairs (36) of photodiodes comprising first photodiodes (30) arranged along a first axis (12) and connected in series in a pair-wise manner. Each of the first photodiodes (30) comprises a space-charge zone (32) having a space-charge zone face (34) oriented towards the radiation incidence face (14). Further, the device is provided with a a shading mask (46) arranged at a distance (44) above the space-charge zone faces (34) of the first photodiodes (30) and comprising radiation-transmitting areas (48). Each radiation-transmitting area (48) is assigned to the space-charge zone faces (34) of the two first photodiodes (30) of a first pair (36) of photodiodes. When viewed in the direction of the normal of the radiation incidence face (14), the degree of overlapping between a radiation-transmitting area (48) and its assigned space-charge zone faces (34) in the direction of the first axis (12) is different for at least two of the first pairs (36) of photodiodes. The device also comprises an evaluation unit (56) for monitoring the photocurrent and/or the photovoltage of each first photodiode (30) of each first pair (36) of photodiodes and for detecting, on the basis of a comparison of the photocurrents and/or the photovoltages, the angle of incidence under which the component of the radiation which in the projection is directed parallel to the first axis (12) impinges on the radiation incidence face (14).

14 Claims, 5 Drawing Sheets

DEVICE FOR DETECTING THE ANGLE OF INCIDENCE OF RADIATION ON A RADIATION INCIDENCE SURFACE

BACKGROUND OF THE INVENTION

1. Field of the Invention

The present invention relates to a device for detecting the angle of incidence of radiation on a radiation incidence surface.

2. Description of Related Art

In a large number of applications, it is convenient to be able to measure the angle of incidence of radiation on a radiation incidence surface by use of measurement technology. Thus, for instance, in the field of air conditioning systems for automobiles, solar sensors are used for detecting the intensity of sunlight incident on the given vehicle and the direction from which the sunlight is incident on the vehicle.

The constructional height of solar sensors for automobiles, i.e. the height by which such sensors extend from the control panel, is normally not negligible. This is perceived of as optically disturbing.

Known from U.S. Pat. No. 5,264,910 and EP-A-0 747 719 A1 are devices for detecting the angle of incidence of radiation wherein a plurality of photodiodes are arranged in a first plane, and a shading mask comprising radiation-transmitting areas and opaque areas is arranged in a second plane above the photodiode. For each pair of photodiodes, the transmitting areas of the shading mask are arranged at a displacement by the same amount. Depending on the angle of incidence of the radiation, a larger or smaller amount of radiation impinges on the photodiodes so that the measuring signal will be a measure for the angle of incidence. Similar devices are also described in U.S. Pat. No. 6,274,862 and U.S. Ser. No. 2002/053,635.

In the known devices, a certain disadvantage is seen in the fact that the angle of incidence has to be detected in an analogous manner, i.e. based on the size of the measurement signal. For the evaluation and subsequent processing of the measuring signal, measurement results in digital form would be considerably more advantageous.

It is an object of the invention to provide a device for detecting the angle of incidence of radiation on a radiation incidence surface wherein the detecting device is of a relatively flat structure and thus is adapted to be integrated into surfaces which can be viewed by the observer.

BRIEF SUMMARY OF THE INVENTION

According to the present invention, the above object is achieved by a device for detecting the angle of incidence of radiation on a radiation incidence surface, wherein the device comprises:

- at last two first pairs of photodiodes comprising first photodiodes arranged along a first axis and connected in series in a pair-wise manner,
- each of the first photodiodes comprising a space-charge zone having a space-charge zone face oriented towards the radiation incidence face,
- a shading mask arranged at a distance above the space-charge zone faces of the first photodiodes and comprising radiation-transmitting areas,
- each radiation-transmitting area being assigned to the space-charge zone faces of the two first photodiodes of a first pair of photodiodes and
- when viewed in the direction of the normal of the radiation incidence face, the degree of overlapping between a radiation-transmitting area and its assigned space-charge zone faces in the direction of the first axis is different for at least two of the first pairs of photodiodes, and
- an evaluation unit which monitors the voltage drop at each first photodiode of each first pair of photodiodes and/or the current passing through each first photodiode of each first pair of photodiodes and on the basis of a comparison of the voltage drops and/or currents detects the angle of incidence under which the component of the radiation, which in the projection is directed parallel to the first axis, impinges on the radiation incidence face,
- the evaluation unit monitoring particularly the potential at the connection point between the first photodiodes of each first pair of photodiodes and/or the currents passing through the first photodiodes of each first pair of photodiodes and on the basis of the change of potential at the connection point of the first pairs of photodiodes and/or the change of the result of a comparison of the relative amounts of the currents passing through the first photodiodes of each pair of photodiodes detects the angle of incidence under which the component of the radiation, which in the projection is directed parallel to the first axis, impinges on the radiation incidence face.

According to the invention, it is provided that a plurality of first photodiodes are arranged adjacent to each other along a first axis. Respectively two adjacent first photodiodes are combined into a first pair of photodiodes. At least two such first pairs of photodiodes are provided. In each first pair of photodiodes, the cathode of one first photodiode is electrically connected to the anode of the other first photodiode.

Each first photodiode comprises a space-charge zone which is exposed to the incident radiation. Above the space-charge zone faces of the first photodiodes, a shading mask is arranged at a distance from the first photodiodes. This shading mask comprises radiation-transmitting areas arranged adjacent to each other along the first axis and separated from each other by areas opaque to radiation. Each radiation-transmitting area is assigned to the space-charge zone faces of a first pair of photodiodes. The arrangement of the radiation-transmitting areas is selected such that the radiation-transmitting areas are located at different displacements relative to the space-charge zone faces assigned to them. Thus, in other words, when viewed in the direction of the normal of the radiation incidence surface, the degree of overlap between a radiation-transmitting area and its assigned space-charge zone faces in the direction of the first axis is different for at least two of the first pairs of photodiodes.

When radiation is incident on the shading mask, the radiation-transmitting areas of the mask allow radiation to pass up to the space-charge zone faces of the individual first pairs of photodiodes. Within a range of radiation incidence angles which is determined by the geometry of the radiation-transmitting areas, by the space-charge zone faces and by the distance of the shading mask from the space-charge zone faces, the space-charge zone faces of one of the first pairs of photodiodes are exposed to the radiation to substantially to the same extent. This can be detected by measurement technology in that, e.g., the voltage at the connection point of the two photodiodes of each first pair of photodiodes is compared with the supply voltage of the pairs of photodiodes. If the voltage and the potential, respectively, is substantially equal to half the supply voltage, this means that the space-charge zone faces of this first pair of photodiodes are subjected to the radiation in a uniform manner. Then, by read-out from a table or another storage means, it can be detected to which angle of incidence of radiation this corresponds. Namely, this angle of incidence of radiation is dependent, inter alia, from the displacement of the radiation-transmitting area of the shading mask, which area is assigned to the space-charge zone faces of the respective first pair of photodiodes. Also included into the computation will be the distance of the shading mask from the photodiodes. Thus, one can assign to each pair of photodiodes that angle of incidence under which the radiation is incident if the potential at the connecting point is e.g. half the supply potential. In this manner, the angle of incidence can be directly determined on a digital basis, which is performed through a comparison between the relative amounts of the photo currents (if the photodiodes are connected to a supply voltage, i.e. the photodiodes are operated as passive elements) or between the photo voltages (if the photodiodes are operated as active components generating a photo voltage when radiation is incident on them) of the photodiodes of each pair of photodiodes, or through the comparison between the potentials at the connection points of each pair of photodiodes.

By way of alternative to half the supply potential, is its also possible to compare e.g. the supply potential of the connection point with any other fraction of the supply potential. Due to the geometrical arrangement (displacements in parallel and vertically to the space-charge zone faces of the photodiodes) it will always be possible to obtain the angle of incidence of the radiation.

The above described evaluation results are supplied to an evaluation unit of the inventive device. Then, very generally speaking, the change of the connection potential from one first pair of photodiodes to another first pair of photodiodes is digitally examined to detect the angle of incidence under which the component of the radiation oriented in parallel to the first axis impinges onto the radiation incidence surface.

The above described linear arrangement can be arranged along two mutually angled first and second axes which, particularly, are orthogonal to each other. It will then be possible to determine the solid angle of incidence under which the radiation impinges onto the radiation incidence surface.

The (horizontal) displacement of the radiation-transmitting areas of the shading mask relative to the space-charge zone faces of the first pairs of photodiodes, which is different for at least some of the first pair of photodiodes, is suitably realized in that the center-to-center distance of the radiation-transmitting areas of the shading mask is different from the center-to-center distance of the first pair of photodiodes. In this regard, it is possible that the respective center-to-center distances, when viewed along the whole first or second axis, are constant or increase or decrease monotonously or change in a different manner, particularly at random. Further, any other arrangement of different positions of radiation-transmitting areas of the shading mask relative to the space-charge zone faces or the first or second pair of photodiodes is possible. However, the respective geometry has to be considered in the evaluation, as already described above.

The advantage of the inventive device is to be seen in that the overall assembly is virtually of the lowest imaginable constructional height. Notably, the inventive device can be integrated into the surface of a semi-conductible substrate or be mounted thereon. In such an arrangement, the photodiodes are embedded in the surface of the semi-conductible substrate while the shading mask, provided e.g. as a metallizing layer produced by semiconductor manufacture technology, is arranged at a distance from the surface of the semi-conductible substrate by means of a dielectric (e.g. silicon dioxide). Of particular use is a SOI substrate comprising a horizontal insulating layer extending substantially parallel to the surface and insulating trenches connected to this layer. This results in the formation of individual islands which are electrically insulated from each other and are adapted to have the photodiodes or pairs of photodiodes arranged therein. Of course, also other substrates can be employed. Thus, the insulated islands can be also realized e.g. by well technologies in which the photodiodes or pairs of photodiodes are inserted in wells which are individually formed in the surface of the substrate and likewise are insulated from each other. As an alternative to the integrated design, also a discrete design can be provided.

It has already been noted above that the inventive linear arrangement of photodiodes connected in pairs is useful for detecting the solid angle of the incident radiation. According to a first variant, such an arrangement is configured such that respectively a first and a second pair of photodiodes are assigned to a common light-transmitting area of the shading mask. For instance, the radiation-transmitting areas can be rectangles whose pairs of mutually opposite edges are assigned to respectively one of the pairs of photodiodes, i.e. the first or the second pair of photodiodes. Suitably, respectively one photodiode is arranged in each of the four partial areas defined by the diagonal lines of the radiation-transmitting area. This results in a photodiodes array structure with a grating-type shading mask.

The shielding of the shading mask, e.g. for protection from damage, can be performed e.g. by an optically "dense" passivation layer, as basically known in semiconductor technology. Onto this layer, a plastic material will be applied, as known e.g. from optical elements or components in photo electronics. The sunlight incident onto the plastic layer from the optically thinner medium, i.e. from the surroundings and thus the air, is deflected in this layer in the direction of the normal; thus, also in case of a flat incidence of sunlight, the maximum allowable angle of incidence will not be reached so that the inventive sensor, when used as a solar sensor, can pick up and detect the incidence of radiation nearly over the complete semi-space (0°–180°).

The invention will be explained in greater detail hereunder with reference to the drawings.

BRIEF DESCRIPTION OF THE SEVERAL VIEWS OF THE DRAWINGS

FIG. 5 is a plan view of a two-dimensional arrangement for detection of the solid angle of incidence of e.g. solar radiation or the like.

DETAILED DESCRIPTION OF THE INVENTION

Figure 1:
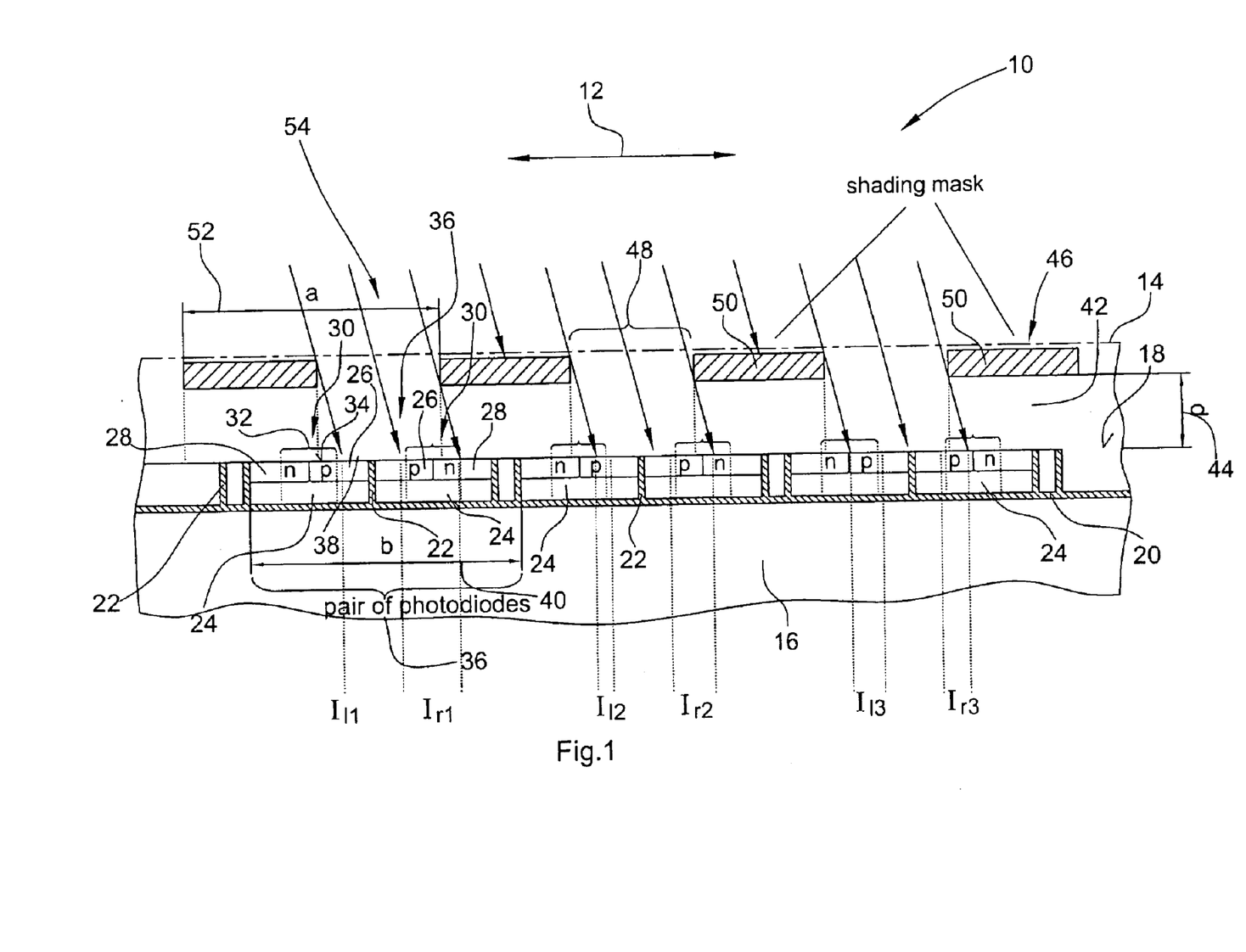
FIG. 1 is a cross-sectional view of the inventive arrangement for the case that the radiation is incident under a detectable first angle.
Figure 2:
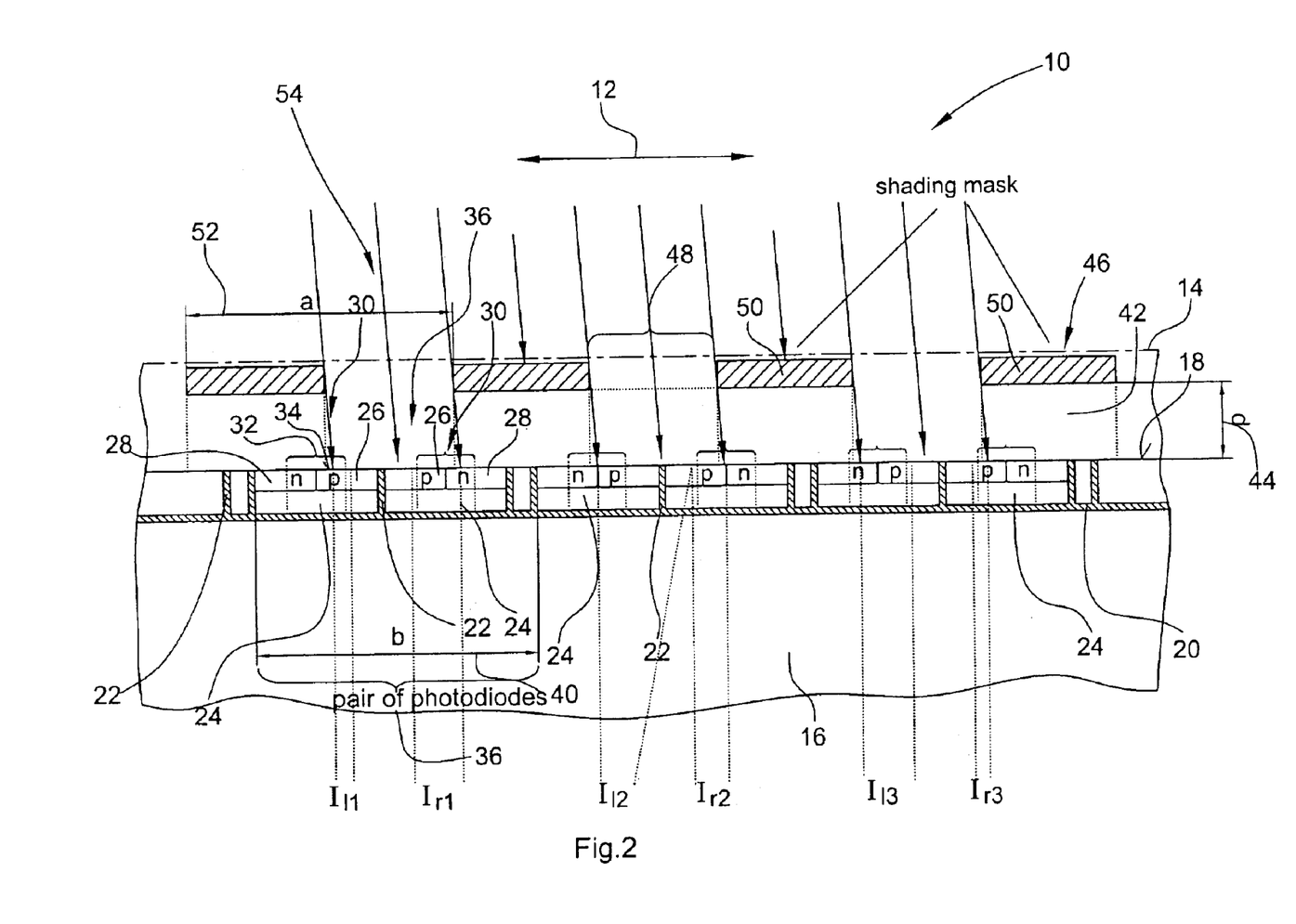
FIG. 2 is a cross-sectional view of the inventive arrangement for the case that the radiation is incident under a detectable second angle.
Figure 3:
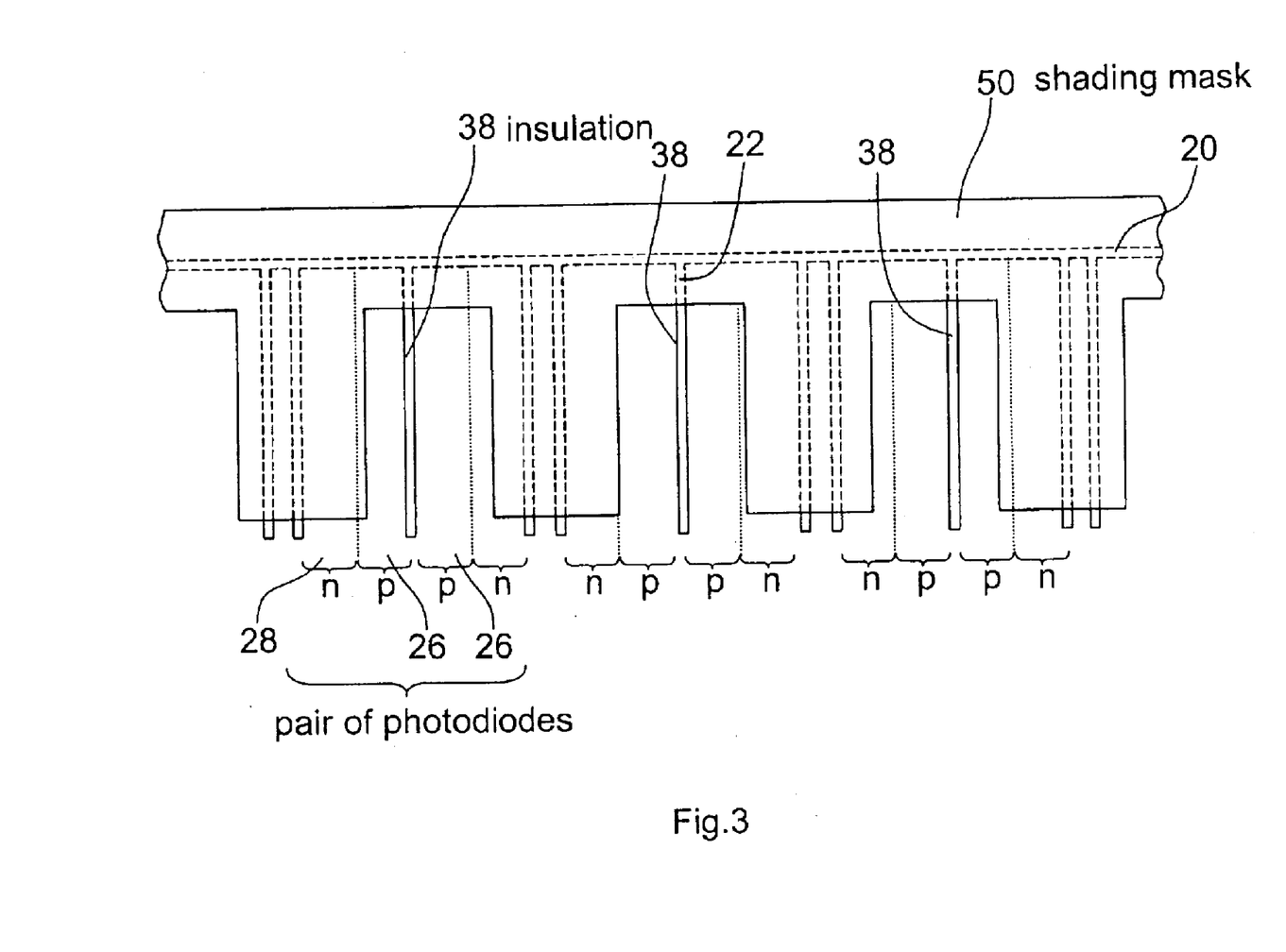
FIG. 3 is a plan view of the arrangement according to FIG. 1 and FIG. 2, respectively.

FIGS. 1 to 3 illustrate the basic configuration of a device 10 for detecting the angle of incidence of that component of a radiation which impinges onto a radiation incidence surface 14 along the axis marked by the twin arrow 12. Device 10 comprises a semiconductor substrate 16 which in the present case is provided as a SOI substrate and includes a horizontal insulating layer 20 extending below the surface 18 of substrate 16. Formed in the surface 18 of substrate 16 are vertical insulating trenches 22 so that the surface 18 of substrate 16 is provided with individual areas 24 dielectrically insulated from each other. In each of these areas 24, a p-doped region 26 and an n-doped region 28 of a photodiode 30 are inserted. Each photodiode 30 comprises a space-charge zone 32 having a space-charge zone face 34 arranged in the surface 18 of substrate 16.

Respectively two adjacent photodiodes 30 are connected to each other to form a pair 36 of photodiodes (not shown). The p- and n-regions 26,28 of the photodiodes 30 of each pair 36 of photodiodes are arranged symmetrically relative to the insulating trench 22 between the photodiodes 30, while the concentrations of the doping substances of the p-regions 26 in comparison with the n-regions 28 are equal or different from each other and the p- or the n-regions 26,28 are respectively doped to the same extent among each other. The distance between adjacent pairs 36 of photodiodes is in this case constant for all pairs 36 of photodiodes, as indicated at 40 in FIG. 1.

Arranged on the surface 18 of substrate 16 is a light-transmitting (insulation) layer 42 of a height indicated at 44. On this layer 42, a shading mask 46 is provided, comprising light-transmitting areas 48 and opaque areas 50. Each light-transmitting area 48 is assigned to the space-charge zone faces 34 of a pair 36 of photodiodes. In this regard, it is provided that the (center-to-center) distance 52 between adjacent light-transmitting areas 48 of the shading mask 46 is different (in this case, smaller) from the distance 40 of adjacent pair 36 of photodiodes.

This geometric arrangement results in a change of position of each light-transmitting area 48 of shading mask 46 relative to the respectively assigned pair 36 of photodiodes. Thus, depending on the respective relative position of the radiation-transmitting area 48 and the pair 36 of photodiodes, the incident radiation 54 will impinge with a higher or lower strength onto one or two space-charge zones 32. Thus, photodiode currents $I_{l1}$ and $I_{r1}$ of a higher or lower strength will be generated in the two photodiodes 30 of each pair 36 of photodiodes, with l representing the left photodiode of a pair of photodiodes in the Figures, r representing the right-hand photodiode, and i=1 . . . , number of the pairs of photodiodes.

In example according to FIG. 1, the following applies:

$I_{l1} < I_{r1}, I_{l2} < I_{r2}, I_{l3} > I_{r3}.$

Thus, the angle under which the radiation is incident lies between those (limiting) angles which are determined by the relative positions, i.e. the displacement, of the pairs 36 of photodiodes shown in the center and on the right side in FIG. 1 relative to the light-transmitting areas 48 of the shading mask 46 assigned to these pairs 36 of photodiodes; notably, for these two pairs of photodiodes, the comparison of the left and right photo currents will change from "smaller than" to "larger than" (or vice versa).

In example according to FIG. 2, the following applies:

$I_{l1} < I_{r1}, I_{l2} = I_{r2}, I_{l3} > I_{r3}.$

This means that the angle is determined by the geometry of the device 10 in the region of the central pair 36 of photodiodes in the Figures, i.e. by the relative displacement from the light-transmitting area to the pair of photodiodes. If the photodiodes 30 of this central pair 36 of photodiodes are supplied with incident radiation in a uniform manner, this radiation has to hit the radiation incidence surface 14 nearly vertically, which is e.g. evident from FIG. 2. Thus, digital evaluation will yield a result regarding the angle of incidence of radiation.

Figure 4:
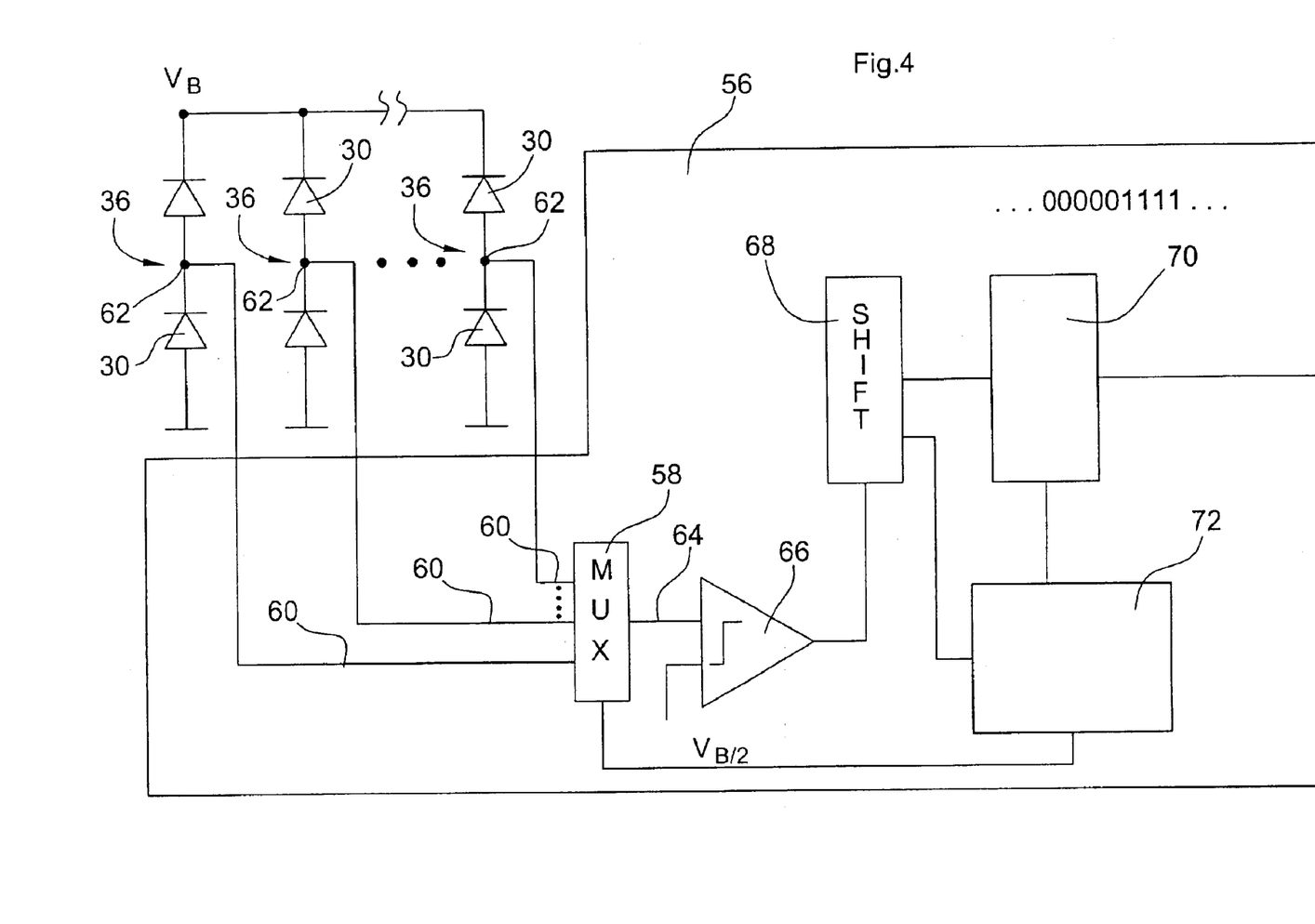
FIG. 4 is a schematic representation, partially in the manner of a block diagram, of the evaluation of the photosensor potentials for detecting the angle of incidence of radiation.

FIG. 4 shows the configuration of an evaluation unit 56 for determining the angle of incidence of the incident radiation. In the present embodiment, this evaluation unit 56 is provided with a n-to-1 multiplexer 58 whose n-inputs 60 are connected to the connection points 62 of the photodiodes 30 of the pairs 36 of photodiodes. The output 64 of multiplexer 58 is connected to a comparator 66 for comparing the respective potential at the connection point 62 with half the supply potential VB/2 of the supply voltage VB of the pairs 36 of photodiodes. This comparison will now be performed for each pair 36 of photodiodes, which at the output of comparator 66 will result in a sequence of ones and zeros clearly assigned to the pairs of photodiodes; the digits will be stored in a shift register 68. This shift register 68 will be read, and the change from zero to one in the sequence of zeros and ones will be detected. Thus, it is now known in which one of the pairs of photodiodes the transition from zero to one occurs. From this, in turn, the angle of incidence of the radiation can be detected, which applies for radiation incident from the left and from the right alike, as viewed in the Figures. The angle of incidence of radiation will then be read from a table 70. The table 70, the shift register 68 and the multiplexer 58 are controlled by a central control unit 72.

Figure 5:
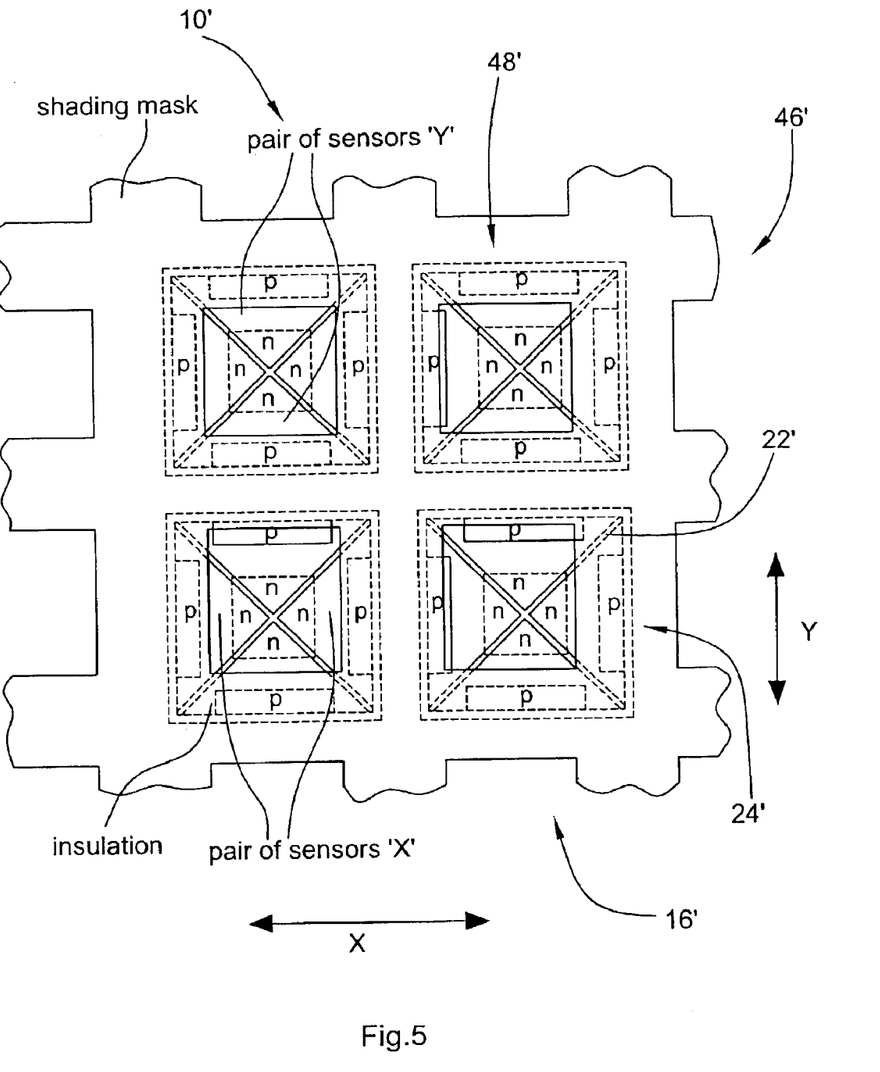

Finally, with reference to FIG. 5, it should be briefly demonstrated in which manner the device 10' is configured for the case that the solid angle of the incident radiation is to be detected. In this case, the shading mask 46' is arranged as a lattice mask. The substrate 16' in this case has quadratic regions defined therein which are insulated from each other by vertical insulation trenches 22' extending along the diagonal lines. In the thus generated four regions 24', the individual photodiodes are formed, namely two photodiodes for the y-direction and two photodiodes for the x-direction. The evaluation in each direction is performed as described above with reference to FIGS. 1 to 4. The displacement of the light-transmitting areas 48' of the shading mask 46' is selected correspondingly so that, both in the x- and in the y-direction, these areas 48' are respectively different from the distances of the y-pairs of photodiodes and the x-pairs of photodiodes.

To sum up, the configuration, the functioning and the evaluation of the inventive device can be outlined as follows.

Configuration (FIGS. 1,3)

A number of integrated pairs of photosensors, comprising p-n-transitions in a semiconductor, are arranged below a shadow mask formed e.g. by a metallization layer. Advantageously, the individual photosensors can be horizontally insulated relative to each other by an insulating layer "IH" to thus achieve an increase of the efficiency of the evaluation, and they can be vertically insulated relative to the common substrate by a layer "IV", which can be realized by SOI technology (FIG. 1), in order to render the signal evaluation as simple as possible. Also an insulation by further p-n transitions (e.g. trench areas) is possible.

The distance "a" between the openings in the shadow mask is different from the distance "b" of the pairs of sensors (FIG. 1). The distances "a" and "b" can be in each case selected to be constant or variable while, however, the conditions a>b or b>a have to be met (cf. also note 1).

This will result in a slightly different position of the pair of sensors under each opening of the shadow mask as compared to the left and/or right neighbors.

Functioning (FIG. 2)

Depending of the angle of incidence of the light and the position of the pair of sensors under the opening of the shadow mask, the "left" or the "right" sensor, or—more accurately—its space-charge zone, is subjected to a relatively stronger incidence of light. The induced photocurrent of the two diodes of each pair of sensors will be compared, and from the result, it will be determined which one of the two diodes is subjected to the light to a higher extent. This is illustrated in FIG. 2. The magnitudes $I_{l1}$, $I_{r1}$ ..., $I_{l3}$, $I_{r3}$ are the respectively illuminated areas of the space-charge zones of the "left" and "right" diodes of a air of sensors. In this representation, the following holds true:

$$I_{l1} < I_{r1}, I_{l2} = I_{r2}, I_{l3} > I_{r3}.$$

Due to the stepwise displacement between the shadow mask and the pairs of sensors, there exists for each angle of incidence a position in which the larger photocurrent changes from one side of a pair of sensors to the other side. This position is a measure for the angle under which the light is incident.

It must be safeguarded that the change of the dominant photocurrent from the one side to the other side of the pair of sensors is detected. As shown in FIG. 2, the transition in this case occurs between the central and the right-hand pair of sensors.

The angular resolution is determined by the distance "d" of the shadow mask to the semiconductor surface and by the difference in the step dimensions "a" and "b" (FIG. 3).

The largest displacement between the opening in the shadow mask and the center of a pair of sensors will determine the maximum angle of incidence.

The width of the opaque webs of the shadow mask has to be selected to the effect that in case of a maximum angle of incidence the next photosensor will not be illuminated as well.

Notes

1. The configuration need not necessarily be selected to the effect that the displacement between the shadow mask and the sensor-pair center is caused to increase or decrease monotonously. Each other arrangement of various positions is possible. It is merely required that the geometry be considered in the evaluation.

2. In the arrangement of the photosensors, it is not positively required that the higher-doped areas be located towards the outside and included an area with a lower doping. Also other geometries are possible, e.g. only a one-sided p-n transition or a higher-doped strip in the middle.

3. The configuration will eventually have to be selected also under the aspects of a prevention of a diffraction of light and the light-refraction effects (optically fitting material interfaces).

Evaluation (FIG. 4)

Evaluation is performed by comparison between the photocurrents of each pair of sensors. If the diodes are electrically insulated from each other, then—in the simplest case—the serial connection of both diodes at a voltage reference VRef (e.g. the supply voltage of the arrangement) can be compared in a comparator with e.g. half the reference voltage (FIG. 4). For all pairs of sensors, this evaluation can be realized in parallel or sequentially by use of a multiplexer, or as a combination of both. In this manner, one will obtain a series of "zeros" and "ones" and thus, in digitalized form, the information indicating the angle of incidence of the light.

The angular resolution can be further increased in that the pair of sensors is compared not only with one voltage but with a plurality of voltages.

Two-Dimensional Detection of Angles (FIG. 5)

By a rectangular arrangement of a second group of pairs of sensors with associated shadow mask in the same plane, the angle of incidence of the light can be detected in two dimensions.

Note

The combination of the pairs of sensors arranged at right angles relative to each other is also possible by use of only one shadow mask with square or rectangular cutouts (FIG. 5).

For a better understanding of the invention, FIGS. 1 and 3 show in each region 24 respectively one p-region and one n-region. However, a photodiode can be formed also in that a normally (weakly) n-doped region 24 is provided with a (heavily) p-doped region therein (this is the case in FIG. 5). Particularly, in each region 24, non-contacting p-doped regions can be provided, thus generating two serially connected photodiodes; one pair of photodiodes is then formed by the respectively two photodiodes of two regions 24. It is of particular advantage if the two p-doped areas of a region 24 are positioned symmetrically, e.g. adjoining the opposite insulation trenches 22.

The invention has been described above with reference to photodiodes as optoelectronic components for the detection of radiation. Of course, use can be made also of other optoelectronic components such as e.g. phototransistors. In the context of the instant invention, a "photodiode" can thus also be understood to be a transistor. Further, the device described herein is useful also for the evaluation of the intensity of the radiation by evaluating the magnitude of the photocurrent and the photovoltage, respectively.

What is claimed is:

1. A device for detecting the angle of incidence of radiation on a radiation incidence surface, comprising:

at least two first pairs of photodiodes comprising first photodiodes arranged along a first axis and connected in series in a pair-wise manner, each of the first photodiodes comprising a space-charge zone having a space-charge zone face oriented towards the radiation incidence face, a shading mask arranged at a distance above the space-charge zone faces of the first photodiodes and comprising radiation-transmitting areas, each radiation-transmitting area being assigned to the space-charge zone faces of the two first photodiodes of a first pair of photodiodes and when viewed in the direction of the normal of the radiation incidence face, the degree of overlapping between a radiation-transmitting area and its assigned space-charge zone faces in the direction of the first axis being different for at least two of the first pairs of photodiodes, and an evaluation unit for monitoring the photocurrent and/or the photovoltage of each first photodiode of each first pair of photodiodes and for detecting, on the basis of a comparison of the photocurrents and/or the photovoltages, the angle of incidence under which the component of the radiation which in the projection is directed parallel to the first axis impinges on the radiation incidence face.

2. The device according to claim 1, wherein the evaluation unit monitors the potential at the connection point between the first photodiodes of each first pair of photodiodes and/or the currents passing through the first photodiodes of each first pair of photodiodes and, on the basis of the change of potential at the connection point of the first pairs of photo-diodes and/or the change of the result of a comparison of the relative amounts of the currents passing through the first photodiodes of each pair of photodiodes, detects the angle of incidence under which the component of the radiation which in the projection is directed parallel to the first axis impinges on the radiation incidence face.

3. The device according to claim 1, wherein the evaluation unit compares the potential at the connection point between the two photo-diodes of a first pair of photodiodes with a reference value which is equal to a specific fraction of the supply potential of this first pair of photodiodes, and wherein the evaluation unit detects the angle of incidence on the basis of a degree of the overlap and the distance between the shading mask and the space charge zone faces of at least one pair of those first pairs of photodiodes for which the connection potential of the one first pair of photodiodes is smaller and the connection potential of the other first pair of photodiodes is larger than the respective reference value.

4. The device according to claim 1, wherein the photo-diodes of the first pairs of photodiodes are substantially identical in design.

5. The device according to claim 3, wherein the reference value is equal to half the supply potential.

6. The device according to claim 1, wherein the center-to-center distance of respectively adjacent radiation-transmitting areas of the shading mask is different from the center-to-center distance of the respectively adjacent first pairs of photodiodes.

7. The device according to claim 6, wherein the center-to-center distance of respectively adjacent radiation-transmitting areas of the shading mask and the center-to-center distance of respectively adjacent first pairs of photodiodes are respectively constant.

8. The device according to claim 1, wherein the first photodiodes are formed on a common semi-conductible substrate.

9. The device according to claim 8, wherein the first photodiodes are electrically insulated from each other by vertical insulation layers inserted into the substrate.

10. The device according to claim 8, wherein the substrate comprises a horizontal insulation layer formed below the arrangement of the first pairs of photodiodes.

11. The device according to claim 8, wherein the substrate is an SOI substrate.

12. The device according to claim 1, wherein an arrangement of second pairs of photodiodes similar to arrangement of first pairs of photodiodes is provided along a second axis extending at an angle to the first axis and wherein the evaluation unit detects the angle of incidence under which the component of the radiation oriented parallel to the second axis is incident onto the radiation incidence surface.

13. The device according to claim 12, wherein the first and second axes extend orthogonally to each other.

14. The device according to claim 12, wherein respectively a first and a second pair of photodiodes are assigned to a common radiation-transmitting area of the shading mask.

* * * * *